Aug. 14, 1956     T. C. HUXLEY III, ET AL     2,758,594
ARTIFICIAL RESPIRATION APPARATUS
Filed Dec. 16, 1952
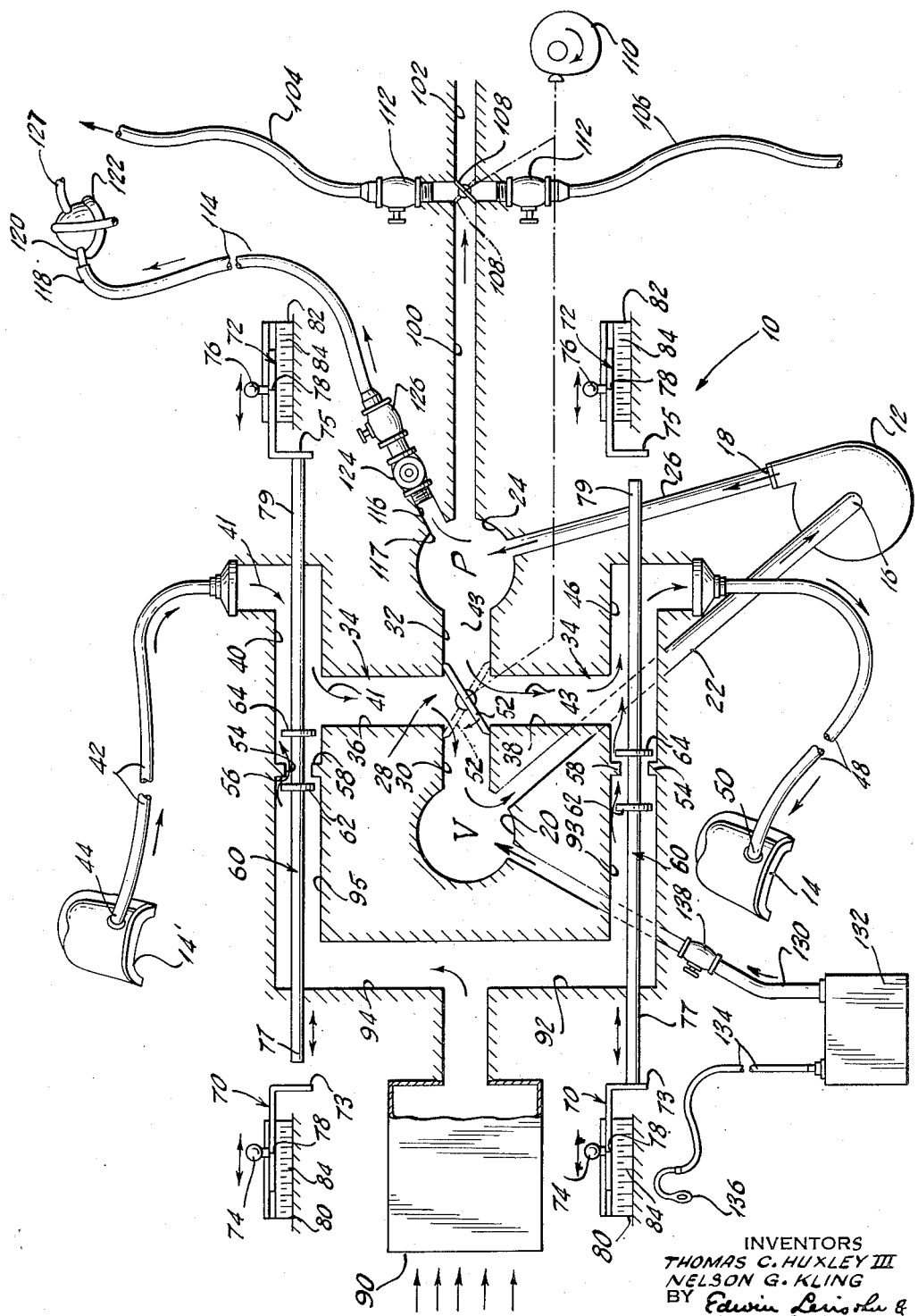
INVENTORS
*THOMAS C. HUXLEY III*
*NELSON G. KLING*
BY *Edwin Lewisohn &*
*Harry Cohen*
ATTORNEYS United States Patent Office 2,758,594
Patented Aug. 14, 1956

2,758,594

ARTIFICIAL RESPIRATION APPARATUS

Thomas C. Huxley III, Manhasset, and Nelson G. Kling, Roslyn, N. Y., assignors to Conitech, Ltd., New York, N. Y., a corporation of New York Application December 16, 1952, Serial No. 326,214

26 Claims. (Cl. 128—30)

This invention relates to artificial respiration apparatus generally and, more particularly, to improvements in pumping apparatus for artificial respiration apparatus of the portable type.

One object of the present invention is the provision of improved adjustable control means in respirator pumping apparatus, the latter being adapted to periodically supply air to and withdraw air from one or more associated cuirasses.

Another object of the present invention is the provision of generally improved respirator pumping apparatus for artificial respiration apparatus of the above character.

Another object of the present invention is the provision of separate conduit means, in artificial respiration apparatus having one or more associated cuirasses, for cyclically supplying air directly to a patient in supplementation of the action of said cuirass or cuirasses.

Another object of the present invention is the provision of separate conduit means, in artificial respiration apparatus having one or more associated cuirasses, for non-cyclically supplying a controlled amount of air directly to a patient.

Yet another object of the present invention is the provision of aspirator means, in artificial respiration apparatus of the above character, which is integrated with such apparatus in a novel manner.

The above and other objects, features and advantages of the present invention will be more fully understood from the following description considered in connection with the accompanying illustrative drawings.

In the drawings the drawing is a schematic representation of the artificial respiration apparatus in accordance with the present invention.

With reference to the drawing, there is shown respirator pumping apparatus 10 having a pump 12 to periodically supply air to and withdraw air from one or more cuirasses 14. The cuirasses 14 may be any of the well known types, for example of the type shown and described in the patent to Thomas C. Huxley III, No. 2,466,108, issued April 5, 1949, for Artificial Respirator. It will be understood that each of the cuirasses 14 is adapted to be fitted to a patient and when so fitted the pump 12 is adapted to periodically supply air to and withdraw air from said cuirass to simulate normal respiration. Thus the pump 12 when operatively associated with one of the cuirasses 14 alternates between partial vacuum and normal pressure of the air within said cuirass at a controlled and variable rate to successfully simulate normal respiration. The pump 12 is preferably of the rotary type having a fluid inlet port 16 and a fluid outlet port 18, said fluid inlet port being connected to a vacuum or suction manifold 20 by means of the conduit 22 and said outlet port being connected to the pressure manifold 24 by means of the conduit 26. It will be understood that the rotary pump 12 which is of any conventional construction is adapted to creat a vacuum in the vacuum manifold or chamber 20 and is adapted to pressurize the pressure manifold or chamber 24 as will be readily apparent. In order to interconnect the rotary pump 12 with the cuirasses 14 there is provided conduit means 28, said conduit means comprising branch conduits 30 and 32 which lead from the vacuum and pressure chambers 20 and 24, respectively, to the conduit 34. The conduit 34 comprises branch conduits 36 and 38 which lead to their associated cuirasses 14, for example the branch conduit 36 is in fluid communication with the cuirass 14' whereas the branch conduit 38 is in fluid communication with the cuirass 14. Thus each of the branch conduits 36 and 38 communicates with a companion cuirass 14 whereby to supply air to and withdraw air from said cuirass. The fluid communication between the branch conduit 36 and the cuirass 14' is effected through the conduit portion 40 and the flexible conduit 42 which has one end 44 in fluid communication with the interior of the cuirass 14'. Similarly the branch conduit 38 is in fluid communication with its companion cuirass 14 through the conduit portion 46 and the flexible conduit 48 which has one end 50 in fluid communication with the interior of its companion cuirass 14. It will be accordingly apparent from the above that the vacuum and pressure chambers 20 and 24, respectively, are adapted for fluid communication with the pair of cuirasses 14 through the intermediation of the conduit means 28 aforedescribed.

Interposed in the conduit 28 is a valve 52 which may be actuated by any suitable means and which is adapted for oscillation between the solid line position and the broken line position, as shown on the drawing. When the valve 40 is in the solid line position the vacuum chamber 20 is in fluid communication with the cuirass 14' as indicated by the arrows 41 and the pressure chamber 24 is in fluid communication with the cuirass 14 as indicated by the arrows 43 whereby it will be apparent that the cuirasses 14 and 14' are sequentially in communication with chambers 20 and 24. Similarly when the cuirass 14' is in fluid communication with the vacuum chamber 20, with the valve 52 in the solid line position, the pressure chamber 24 will be out of fluid communication with said cuirass. Thus the valve means constituted by the valve 52 and branch conduits 30 and 32 alternately and cyclically connects the pump pressure and vacuum outlets 18 and 16, respectively, to the branch conduits 36 and 38 which are in fluid communication with a companion cuirass 14.

In order to adjustably control the amount of air periodically supplied to and withdrawn from each of the cuirasses 14, there is provided a port 54 interposed in each of the conduit portions 40 and 46. Each of the ports 54 defines a pair of valve seats 56 and 58 on the opposite sides thereof, the venting of said port being controlled by an associated valve member 60. Since each of the ports 54 and associated structure are identical only the port 54 and associated structure for controlling the amount of air periodically supplied to and withdrawn from cuirass 14' will be described in detail. The valve member 60 is axially movable in conduit portion 40 and is provided with a pair of laterally spaced valve elements 62 and 64 which are adapted to cooperate with their associated valve seats 56 and 58, respectively, for controlling the venting of the port 54. The valve member 60 is pressure actuated by the pressure differential between atmospheric pressure and the pressure in the conduit portion 40, and means are provided for limiting the axial movement of the member 60 in two opposite directions whereby to control the fluid venting of the port 54 when both pressure and vacuum is applied to cuirass 14'. More particularly, there is provided a pair of stop members 70 and 72 having parts 73 and 75, respectively, which are adapted to co-act with the adjacent ends 77 and 79, respectively, of the member 60 to limit the axial movement thereof. The stop members 70 and 72 are structurally identical and cooperate with the valve member 60 in a similar manner. The stop members 70 and 72 are axially adjustable in any desired manner relative to their carrying brackets or holders 80 and 82, respectively, and suitable means are provided for facilitating their axial movement for positioning said members in adjusted position, for example finger portions 74 and 76, respectively. Each of the members 70 and 72 may be provided with a suitable reference line 78 and the stop holders or brackets 80 and 82 may be provided with a graduated scale 84 whereby to faciltate the adjustment of the stop members 70 and 72. Thus each of the stop members 70 and 72 are axially movable relative to their holders 80 and 82, respectively, and the latter are preferably graduated as aforedescribed to facilitate the adjustment of said members. It will be understood that an adjustable control means as aforedescribed will be associated with each of the cuirasses 14 and that said adjustable control means for each of the cuirasses will be both functionally and structurally similar. When the cuirass 14' is in fluid communication with the vacuum chamber 20 the valve member 60 will be pressure urged towards the stop member 72 and said valve member will abut the projecting part 75 of the member 72 whereby to permit a predetermined amount of atmospheric air to enter the conduit portion 40 through the port 54. The amount of air admitted through the port 54 will be controlled by the positioning of the member 72 whereby it will be apparent that the stop member 72 will constitute the vacuum adjustment for cuirass 14'. It will be understood that the greater the amount of air admitted through port 54, the lower will be the amount of vacuum applied to cuirass 14'. Similarly when pressure above atmospheric is admitted to the conduit portion 40 the valve member 60 will be pressure urged towards the stop member 70 whereby the latter constitutes the pressure adjustment for the cuirass 14'. It will be apparent that the greater the amount of air vented through port 54 when portion 40 is in communication with chamber 24, the lower will be the amount of pressure applied to cuirass 14'. Thus when conduit portion 40 is in communication with the pressure chamber 24 valve member 60 will be pressure urged against the projecting part 73 of the stop 70 whereby an amount of air will be vented through the port 54 corresponding to the adjusted position of the stop member 70. Thus the cuirass 14' is provided with two independent adjustments for controlling the amount of pressure and vacuum cyclically applied thereto, the stop member 72 constituting the vacuum adjustment and the stop member 70 constituting the pressure adjustment. Each of the ports 54 is in communication with the atmosphere through the air inlet chamber 90 which is preferably provided with a suitable muffler to muffle the sound of air passing through said chamber. The inlet chamber 90 is in communication with a pair of branch conduits 92 and 94, the conduit 92 communicating with the port 54 associated with cuirass 14 and the conduit 94 being in communication with the port 54 associated with cuirass 14'. Accordingly each of the ports 54 communicates with the atmosphere through the intermediation of the branch conduits 92 and 94 and atmospheric inlet 90. If desired, each of the branch conduits 92 and 94 may be provided with a separate and independent air inlet instead of the common air inlet chamber 90 shown on the drawing. Branch conduit 92 has a portion 93 at right angles thereto and similarly branch conduit 94 has a portion 95 at right angles thereto, said portions 93 and 95 communicating directly with an associated port 54. From the above it will be apparent that each of the cuirasses 14 is provided with independent pressure and vacuum adjustments, which adjustments are effected by controlling the venting of an associated port 54, said venting control being accomplished by limiting the axial movement of the valve member 60 in two opposite directions, all as described above in detail.

Communicating with the pressure chamber 24, in fluid flow relation therewith, is a conduit 100, said conduit terminating in a branch conduit portion 102 leading to the atmosphere. The conduit 100 is adapted to be in fluid communication alternately and cyclically with the conduits 104 and 106, said conduit 104 being adapted to be associated with a patient utilizing the cuirass 14' and said conduit 106 being adapted to be associated with a patient utilizing the cuirass 14. Interposed between the conduits 100 and 102 and conduits 104 and 106 is a valve 108 which is adapted to be oscillated between the solid line position and the dotted line position in timed relation with the valve 52. The valves 52 and 108 are oscillated in timed relation by any suitable means, for example by the cam 110 which is shown schematically connected to said valves. When the cuirass 14' has vacuum applied thereto the conduit 104 will be in fluid communication with the pressure conduit 100 whereby it will be evident that when cuirass 14' has vacuum applied thereto the valve 108 will be in a solid vacuum line position in which the conduits 100 and 104 will be in fluid communication with each other. Similarly when pressure is applied to the cuirass 14' the conduit 104 will be out of fluid communication with the pressure conduit 100. When one of the conduits 104 or 106 is pressurized the other of said conduits will be opened to atmosphere through the conduit 102. Cuirass 14 and its companion conduit 106 function in an identical manner as the cuirass 14' and its associated conduit 104 whereby it will be apparent that when pressure is applied to cuirass 14 conduit 106 will be open to the atmosphere. Thus when pressure is applied to cuirass 14' vacuum will be applied to cuirass 14 and when vacuum is applied to one of said cuirasses its companion conduit 104 and 106 will be in fluid communication with the pressure conduit 100. As pointed out above the valves 52 and 108 may be actuated by any suitable means in timed relation with each other whereby to cyclically interconnect the pump 12 with the cuirasses 14 and 14' and to cyclically interconnect their associated conduits 106 and 104, respectively, with the conduit 100. The conduits 104 and 106 will terminate in suitable mouth-pieces or to a tracheotomy tube (not shown), each of said mouth pieces or tubes being adapted to be received in a patient's mouth for cyclically supplying air directly to the patient in supplementation of the action of the cuirass associated with the patient and can also be used when the cuirass is removed. Thus the conduit 104 is adapted to be used in conjunction with the cuirass 14' so that when the latter is applied to a patient the mouth-piece of the conduit 104 can be inserted in the patient's mouth to supply air to the patient when vacuum is applied to the cuirass 14'. It will be apparent, therefore, that the conduits 104 and 106 are operative to cyclically supply air to a patient through the patient's mouth to supplement the action of the cuirass applied to the patient's body. It will be understood that in certain cases the action of the cuirass 14 will be sufficient for the patient in which case the companion conduit 104 or 106 will not be used. Interposed in the conduits 104 and 106 are manually operable valves 112 which are adapted to control the amount of fluid flow through their associated conduit. Thus each of the conduits 104 and 106 is independently controllable as to the amount of fluid flow therethrough by means of an associated manually operable valve 112.

In order to non-cyclically supply a controlled amount of air directly to a patient there is provided a conduit 114 which has one end 116 connected to the port 117 of the pressure manifold 24 and has its opposite end 118 connected to the inlet fitting 120 of a suitable face mask 122. Interposed in the conduit 114 is a pressure regulating valve 124 and a manually operable valve 126 which are in series with each other and are adapted to control the amount of fluid flow from the pressure manifold 24 to the face mask 122. The pressure regulating valve 124 is preset to limit the fluid flow through the conduit 114 to a predetermined maximum amount and the valve 126 is manually operable by either the patient or an operator to regulate the amount of fluid flow through the conduit 114. The face mask 122 is provided with a conventional outlet fitting 127 which communicates with the atmosphere. It will be understood that whenever desired the face mask 122 may be applied to a patient to provide therapeutic internal positive pressure. Thus the conduit 114 provides a constant source of non-cyclical air for a patient and the conduits 104 and 106 provide a cyclical air supply for a patient.

Communicating with the vacuum chamber 20 by means of the conduit 130 is an aspirator 132 which has an outlet conduit 134 terminating in a mouth-piece 136. Interposed in the conduit 130 is a manually operable valve 138 which is adapted to control the vacuum flow through the aspirator 132. Thus the vacuum chamber 20 provides a constant source of vacuum supply for the aspirator 132, the latter having a mouth-piece 136 which is adapted to be positioned in a patient's mouth to remove mucus or other foreign matter therefrom to aid the patient in breathing and to comfort him. All of the conduit connections aforedescribed are preferably of the readily connectible and disconnectible type so that the components aforedescribed may be quickly and facilely connected to, and disconnected from, the apparatus 10.

It will be understood that if desired the apparatus 10 may be readily utilized for supplying air to and withdrawing air from a single cuirass 14, for example cuirass 14'. In such a case the port 54, associated with the cuirass 14, and associated valve structure can be omitted and the conduit portion 46 closed off, or, if desired, the valve member 60 associated with the cuirass 14 can be locked in a mid-position relative to its port 54 and the conduit portion 46 closed off. Thus the rotary pump 12 may be operatively associated with either a pair of cuirasses or a single cuirass and in the latter case the cuirass not being used may be readily disassociated from the apparatus 10 in a manner as described above.

While I have shown and described the preferred embodiment of my invention, it will be understood that various changes may be made in the present invention without departing from the underlying idea or principles of the invention within the scope of the appended claims.

Having thus described our invention, what we claim and desire to secure by Letters Patent, is:

1. In respirator pumping apparatus having pumping means adapted to periodically supply air to and withdraw air from a cuirass, conduit means interconnected with said pumping means in fluid flow relation, a port in fluid communication with said conduit means, valve means for controlling the venting of said port, said valve means comprising a member movable axially of said port, and means for limiting the axial movement of said member whereby to control the fluid venting of said port.

2. In respirator pumping apparatus having pumping means adapted to periodically supply air to and withdraw air from a cuirass, conduit means interconnected with said pumping means in fluid flow relation, a port in fluid communication with said conduit means, valve means for controlling the venting of said port, said valve means comprising a member movable axially of said port, and means for limiting the axial movement of said member whereby to control the fluid venting of said port, said last mentioned means comprising a stop provision associated with each of the ends of said axially movable member, one of said stop provisions being adapted to limit the movement of said member in one direction and the other one of said stop provisions being adapted to limit the movement of said member in an opposite direction.

3. In respirator pumping apparatus having pumping means adapted to periodically supply air to and withdraw air from a cuirass, conduit means interconnected with said pumping means in fluid flow relation, a port in fluid communication with said conduit means, valve means for adjustably controlling the venting of said port, said valve means comprising a member movable axially of said port, and means for adjustably limiting the axial movement of said member whereby to control the fluid venting of said port, said last mentioned means comprising an adjustable stop provision associated with each of the ends of said axially movable member, one of said stop provisions being adapted to limit the movement of said member in one direction and the other one of said stop provisions being adapted to limit the movement of said member in an opposite direction.

4. In respirator pumping apparatus having pumping means adapted to periodically supply air to and withdraw air from a cuirass, conduit means interconnected with said pumping means in fluid flow relation, a port in fluid communication with said conduit means, valve means for controlling the venting of said port, said valve means comprising a member movable axially of said port in two opposite directions for controlling the venting of said port when said pumping means supplies air to said conduct means and withdraws air therefrom, and means for adjustably limiting the movement of said member in said opposite directions.

5. In respirator pumping apparatus having pumping means adapted to periodically supply air to and withdraw air from a cuirass, conduit means interconnected with said pumping means in fluid flow relation, a port in fluid communication with said conduit means, said port defining a pair of valve seats on the opposite sides thereof, valve means for controlling the venting of said port, said valve means comprising an axially movable member having a pair of spaced valve elements, one of said elements being adapted to coact with one of said valve seats and the other of said elements being adapted to coact with the other of said valve seats, and means for limiting the axial movement of said member in two opposite directions whereby to control the fluid venting of said port.

6. In respirator pumping apparatus, a cuirass, pumping means to periodically supply air to and withdraw air from said cuirass, conduit means interconnecting said pumping means and said cuirass in fluid flow relation, a port in fluid communication with said conduit means, said port defining a pair of valve seats on the opposite sides thereof, valve means for controlling the venting of said port, said valve means comprising an axially movable member having a pair of laterally spaced valve elements, one of said elements being adapted to coact with one of said valve seats to control the fluid venting of said port when said pumping means supplies air to said cuirass, and the other of said elements being adapted to coact with the other of said valve seats when said pumping means withdraws air from said cuirass, and adjustable means for limiting the axial movement of said member in two opposite directions.

7. In respirator pumping apparatus, a cuirass, pumping means to periodically supply air to and withdraw air from said cuirass, conduit means interconnecting said pumping means and said cuirass in fluid flow relation, a port in fluid communication with said conduit means, valve means for controlling the venting of said port, said valve means comprising a member movable in two opposite directions for controlling the venting of said port when said pumping means supplies air to said cuirass and withdraws air therefrom, and means for limiting the movement of said member in said opposite directions, said pumping means comprising a rotary pump having pressure and vacuum outlets adapted for fluid communication with said conduit means and valve means interposed in said conduit means for cyclically connecting said pump pressure and vacuum outlets to said cuirass.

8. In respirator pumping apparatus having pumping means adapted to periodically supply air to and withdraw air from a pair of cuirasses, conduit means interconnected with said pumping means in fluid flow relation, a pair of ports in fluid communication with said conduit means, independent valve means associated with each of said ports for controlling the venting thereof, each of said valve means comprising a member movable axially of its associated port, and means for limiting the axial movement of each of said members whereby to control the fluid venting of each of their associated ports, each of said ports and companion valve means being adapted for association with a companion cuirass.

9. In respirator pumping apparatus having pumping means adapted to periodically supply air to and withdraw air from a pair of cuirasses, conduit means interconnected with said pumping means in fluid flow relation, a pair of ports in fluid communication with said conduit means, independent valve means associated with each of said ports for controlling the venting thereof, each of said valve means comprising a member movable axially of its associated port, and means for limiting the axial movement of each of said members whereby to control the fluid venting of each of their associated ports, each of said ports and companion valve means being adapted for association with a companion cuirass, said pumping means comprising a rotary pump having pressure and vacuum outlets adapted for fluid communication with said conduit means, and valve means interposed in said conduit means for alternately and cyclically connecting said pump pressure and vacuum outlets thereto.

10. In respirator pumping apparatus, a pair of cuirasses, pumping means to periodically supply air to and withdraw air from said pair of cuirasses, conduit means interconnecting said pumping means and said cuirasses in fluid flow relation, said conduit means comprising a pair of branch conduits, each of said branch conduits communicating with a companion cuirass, a port in fluid communication with each of said branch conduits, and independent valve means associated with each of said ports for controlling the venting thereof, said pumping means comprising a rotary pump having pressure and vacuum outlets adapted for fluid communication with said conduit means, and valve means interposed in said conduit means for alternately and cyclically connecting said pump pressure and vacuum outlets to each of said branch conduits whereby to periodically supply air to and withdraw air from each of said cuirasses alternately.

11. In respirator pumping apparatus, a pair of cuirasses, pumping means to periodically supply air to and withdraw air from said pair of cuirasses, conduit means interconnecting said pumping means and said cuirasses in fluid flow relation, said conduit means comprising a pair of branch conduits, each of said branch conduits communicating with a companion cuirass, a port in fluid communication with each of said branch conduits, and independent valve means associated with each of said ports for controlling the venting thereof, said pumping means comprising a rotary pump having pressure and vacuum outlets adapted for fluid communication with said conduit means, and valve means interposed in said conduit means for alternately and cyclically connecting said pump pressure and vacuum outlets to each of said branch conduits whereby to periodically supply air to and withdraw air from each of said cuirasses alternately, each of said ports defining a pair of valve seats on the opposite sides thereof, and each of said independent valve means comprising an axially movable member having a pair of spaced valve elements, one of said elements being adapted to coact with one of said valve seats and the other of said elements being adapted to coact with the other of said valve seats and means for limiting the axial movement of each of said members in two opposite directions whereby to control the fluid venting of its associated port.

12. In respirator pumping apparatus, a cuirass, pumping means to periodically supply air to and withdraw air from said cuirass, conduit means interconnecting said pumping means and said cuirass in fluid flow relation, separate conduit means adapted for fluid communication with said pumping means, and means for interconnecting said pumping means and said separate conduit means cyclically whereby to supply air cyclically directly to a patient and supplement the action of said cuirass, said pumping means comprising a rotary pump having pressure and vacuum outlets adapted for fluid communication with said conduit means, said separate conduit means being adapted to be cyclically interconnected with said pressure outlet.

13. In respirator pumping apparatus, a cuirass, pumping means to periodically supply air to and withdraw air from said cuirass, conduit means interconnecting said pumping means and said cuirass in fluid flow relation, separate conduit means adapted for fluid communication with said pumping means, and means for interconnecting said pumping means and said separate conduit means cyclically whereby to supply air cyclically directly to a patient and supplement the action of said cuirass, said pumping means comprising a rotary pump having pressure and vacuum outlets adapted for fluid communication with said conduit means, and valve means interposed in said conduit means for cyclically connecting said pump pressure and vacuum outlets to said cuirass, separate valve means interposed in said separate conduit means and operable in timed relation with said valve means to cyclically interconnect said pump pressure outlet and said separate conduit means.

14. In respirator pumping apparatus having pumping means to periodically supply air to and withdraw air from a cuirass, conduit means interconnected with said pumping means in fluid flow relation, separate conduit means adapted for fluid communication with said pumping means, and means for interconnecting said pumping means and said separate conduit means cyclically whereby to supply air cyclically directly to a patient, said pumping means comprising a rotary pump having pressure and vacuum outlets adapted for fluid communication with said conduit means, and valve means interposed in said conduit means for cyclically connecting said pump pressure and vacuum outlets to said conduit means, separate valve means interposed in said separate conduit means and operable in timed relation with said valve means to cyclically interconnect said pump pressure outlet and said separate conduit means, and means for cyclically actuating said valve means and said separate valve means so that when said vacuum outlet is connected to said conduit means said pressure outlet is in fluid communication with said separate conduit means.

15. In respirator pumping apparatus, a cuirass, pumping means to periodically supply air to and withdraw air from said cuirass, conduit means interconnecting said pumping means and said cuirass in fluid flow relation, separate conduit means adapted for fluid communication with said pumping means, and means for interconnecting said pumping means and said separate conduit means cyclically whereby to supply air cyclically directly to a patient and supplement the action of said cuirass, said pumping means comprising a rotary pump having pressure and vacuum outlets adapted for fluid communication with said conduit means, and valve means interposed in said conduit means for cyclically connecting said pump pressure and vacuum outlets to said cuirass, separate valve means interposed in said separate conduit means and operable in timed relation with said valve means to cyclically interconnect said pump pressure outlet and said separate conduit means, and means for cyclically actuating said valve means and said separate valve means so that when said vacuum outlet is connected to said cuirass said pressure outlet is in fluid communication with said separate conduit means, the latter having manually operable valve means interposed therein whereby to provide for the regulation of the volume of fluid discharged through said separate conduit means.

16. In respirator pumping apparatus, a pair of cuirasses, pumping means to periodically supply air to and withdraw air from said pair of cuirasses, conduit means interconnecting said pumping means and said cuirasses, in fluid flow relation, said conduit means comprising a pair of branch conduits, each of said branch conduits communicating with a companion cuirass, said pumping means comprising a rotary pump having pressure and vacuum outlets adapted for fluid communication with said conduit means, and valve means interposed in said conduit means for alternately and cyclically connecting said pump pressure and vacuum outlets to each of said branch conduits whereby to periodically supply air to and withdraw air from each of said cuirasses alternately, separate conduit means adapted for fluid communication with said pump pressure outlet, said separate conduit means comprising a pair of branch separate conduits, each of said branch separate conduits being adapted to be associated with a companion cuirass, separate valve means interposed in said separate conduit means and adapted to alternately and cyclically interconnect said pump pressure outlet and said branch separate conduits, and means for cyclically actuating said valve means and said separate valve means so that when said vacuum outlet is connected to one of said cuirasses said pressure outlet is in fluid communication with a companion branch separate conduit and the other of said cuirasses.

17. In respirator pumping apparatus, a cuirass, pumping means to periodically supply air to and withdraw air from said cuirass, conduit means interconnecting said pumping means and said cuirass in fluid flow relation, separate conduit means adapted for fluid communication with said pumping means, the latter comprising a rotary pump having pressure and vacuum outlets adapted for fluid communication with said conduit means, said separate conduit means being adapted to be interconnected with said pump pressure outlet whereby to supply air directly to a patient when said cuirass is removed from the latter, and manually operable valve means interposed in said separate conduit means whereby to provide for the regulation of the volume of fluid discharged through said separate conduit means.

18. Artificial respiration apparatus comprising a cuirass adapted to be applied to the patient's body, a rotary air pump operable to produce sub-atmospheric pressure and superatmospheric pressure at its inlet and outlet, respectively, passages for providing communication between said cuirass and said inlet and outlet of said pump, valve means for controlling the passage of air through said passages from the outlet of said pump to said cuirass and from the cuirass to the inlet of said pump, and means for operating said valve means cyclically for providing super-atmospheric pressure and sub-atmospheric pressure alternately in the cuirass, means providing an additional passage having its inlet connected to the outlet of said pump and having an outlet to supply super-atmospheric pressure to the patient orally, and valve means controlling said additional passage cyclically in timed relation to said first mentioned valve means so as to supply air to the patient when subatmospheric pressure is provided in said cuirass.

19. Artificial respiration apparatus comprising a cuirass adapted to be applied to the patient's body, an air pump operable to produce sub-atmospheric pressure and super-atmospheric pressure at its inlet and outlet, respectively, passages for providing communication between said cuirass and said inlet and outlet of said pump, valve means for controlling the passage of air through said passages from the outlet of said pump to said cuirass and from the cuirass to the inlet of said pump, and means for operating said valve means cyclically for providing super-atmospheric pressure and sub-atmospheric pressure alternately in the cuirass, means providing an additional passage having its inlet connected to the outlet of said pump and having an outlet to supply super- atmospheric pressure to the patient orally, and valve means controlling said additional passage cyclically in timed relation to said first mentioned valve means so as to supply air to the patient when subatmospheric pressure is provided in said cuirass, and means operable independently of the pump to regulate the pressure of the air supplied to said additional passage.

20. Artificial respiration apparatus comprising a cuirass adapted to be applied to the patient's body, an air pump operable to produce sub-atmospheric pressure and super-atmospheric pressure at its inlet and outlet, respectively, passages for providing communication between said cuirass and said inlet and outlet of said pump, valve means for controlling the passage of air through said passages from the outlet of said pump to said cuirass and from the cuirass to the inlet of said pump, and means for operating said valve means cyclically for providing super-atmospheric pressure and sub-atmospheric pressure alternately in the cuirass, means providing an additional passage having its inlet connected to the outlet of said pump and having an outlet to supply super-atmospheric pressure to the patient orally, and valve means controlling said additional passage cyclically in timed relation to said first mentioned valve means so as to supply air to the patient when subatmospheric pressure is provided in said cuirass, said last mentioned valve means being operable to connect said additional passage cyclically to atmosphere when super-atmospheric pressure is provided in the cuirass.

21. Artificial respiration apparatus comprising a cuirass adapted to be applied to the patient's body, an air pump operable to produce sub-atmospheric pressure and super-atmospheric pressure at its inlet and outlet, respectively, passages for providing communication between said cuirass and said inlet and outlet of said pump, valve means for controlling the passage of air through said passages from the outlet of said pump to said cuirass and from the cuirass to the inlet of said pump, and means for operating said valve means cyclically for providing super-atmopsheric pressure and sub-atmospheric pressure alternately in the cuirass, means providing an additional passage having its inlet connected to the outlet of said pump and having an outlet to supply super-atmospheric pressure to the patient orally, and valve means controlling said additional passage cyclically in timed relation to said first mentioned valve means so as to supply air to the patient when sub-atmospheric pressure is provided in said cuirass, said last mentioned valve means being operable to connect said additional passage cyclically to atmosphere when super-atmospheric pressure is provided in the cuirass, and means operable independently of said pump to regulate the sub-atmospheric and super-atmospheric pressures in the cuirass.

22. Artificial respiration apparatus comprising a cuirass adapted to be applied to the patient's body, an air pump operable to produce sub-atmospheric pressure and super-atmospheric pressure at its inlet and outlet, respectively, passages for providing communication between said cuirass and said inlet and outlet of said pump, valve means for controlling the passage of air through said passages from the outlet of said pump to said cuirass and from the cuirass to the inlet of said pump, and means for operating said valve means cyclically for providing super-atmospheric pressure and sub-atmospheric pressure alternately in the cuirass, means providing an additional passage having its inlet connected to the outlet of said pump and having an outlet to supply super-atmospheric pressure to the patient orally, and valve means controlling said additional passage cyclically in timed relation to said first mentioned valve means so as to supply air to the patient when subatmospheric pressure is provided in said cuirass, said last mentioned valve means being operable to connect said additional passage cyclically to atmosphere when super-atmospheric pressure is provided in the cuirass, and means operable independently of said pump to regulate the sub-atmospheric and super-atmospheric pressures in the cuirass, and means operable independently of the pump to regulate the pressure of the air supplied to said additional passage.

23. Apparatus according to claim 18, further characterized in that a second cuirass and a companion additional passage are provided and are cyclically provided with air pressures diametrically opposite in phase to the air pressures in the first cuirass and in the first mentioned companion additional passage.

24. Artificial respiration apparatus comprising a pair of cuirasses, an air pump operable to periodically supply air to and withdraw air from said pair of cuirasses, conduit means interconnecting said pumping means and said cuirasses in fluid flow relation, valve means for controlling the passage of air through said conduit means, and means for operating said valve means cyclically for supplying air to and withdrawing air from each of said cuirasses in diametrically opposite phase relationship.

25. Artificial respiration apparatus comprising a pair of cuirasses, an air pump operable to periodically supply air to and withdraw air from said pair of cuirasses, conduit means interconnecting said pumping means and said cuirasses in fluid flow relation, valve means for controlling the passage of air through said conduit means, means for operating said valve means cyclically for supplying air to and withdrawing air from each of said cuirasses in diametrically opposite phase relationship, and means operable independently of said pump to regulate the air supplied to and withdrawn from each of said cuirasses.

26. In respirator pumping apparatus, a cuirass, pumping means to periodically supply air to and withdraw air from said cuirass, conduit means interconnecting said pumping means and said cuirass in fluid flow relation, separate conduit means adapted for fluid communication with said pumping means, and means for interconnecting said pumping means and said separate conduit means cyclically whereby to supply air cyclically directly to a patient and supplement the action of said cuirass, said pumping means having a pressure outlet adapted for cyclical fluid communication with said separate conduit means, and cyclically operable valve means interposed in said separate conduit means for cyclically interconnecting said pressure outlet and said separate conduit means.

References Cited in the file of this patent
UNITED STATES PATENTS

| | | |
|---|---|---|
| 1,786,350 | Lambert | Dec. 23, 1930 |
| 1,906,453 | Drinker | May 2, 1933 |
| 2,456,724 | Mullikin | Dec. 21, 1948 |
| 2,468,741 | Emerson | May 3, 1949 |
| 2,581,893 | Wilm | Jan. 8, 1952 |
| 2,699,163 | Engstrom | Jan. 11, 1955 |